(12) United States Patent
Shi

(10) Patent No.: US 10,974,284 B2
(45) Date of Patent: Apr. 13, 2021

(54) CLEANING SYSTEM AND CLEANING APPARATUS

(71) Applicant: Wuhan China Star Optoelectronics Technology Co., Ltd., Wuhan (CN)

(72) Inventor: Jie Shi, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 351 days.

(21) Appl. No.: 16/311,682

(22) PCT Filed: Nov. 15, 2018

(86) PCT No.: PCT/CN2018/115551
§ 371 (c)(1),
(2) Date: Dec. 20, 2018

(87) PCT Pub. No.: WO2020/062487
PCT Pub. Date: Apr. 2, 2020

(65) Prior Publication Data
US 2020/0122201 A1     Apr. 23, 2020

(30) Foreign Application Priority Data
Sep. 29, 2018  (CN) .......................... 201811150461.1

(51) Int. Cl.
*B08B 1/00*     (2006.01)
*B25J 15/06*    (2006.01)
*B25J 18/00*    (2006.01)
*B08B 1/04*     (2006.01)

(52) U.S. Cl.
CPC ................ *B08B 1/008* (2013.01); *B08B 1/04* (2013.01); *B25J 15/0608* (2013.01); *B25J 18/00* (2013.01)

(58) Field of Classification Search
CPC ........ B08B 1/008; B08B 1/04; B25J 15/0608; B25J 18/00
See application file for complete search history.

(56) References Cited

U.S. PATENT DOCUMENTS

| | | | | |
|---|---|---|---|---|
| 5,286,160 A | * | 2/1994 | Akeel | B05B 13/0292 118/326 |
| 6,267,022 B1 | | 7/2001 | Suzuki | |
| 2007/0170040 A1 | * | 7/2007 | Handy | B08B 3/024 198/495 |
| 2016/0214144 A1 | * | 7/2016 | Swanberg | B08B 1/00 |

(Continued)

FOREIGN PATENT DOCUMENTS

| | | |
|---|---|---|
| CN | 102579105 | 7/2012 |
| CN | 203138329 | 8/2013 |
| CN | 204685531 | 10/2015 |

(Continued)

*Primary Examiner* — Weilun Lo

(57) ABSTRACT

The present disclosure provides a cleaning system and a cleaning apparatus. The cleaning system includes a cleaning apparatus and a robot. The robot includes at least one robot arm. The cleaning apparatus includes at least one adaptor mechanism and a cleaning mechanism. The adaptor mechanism connects the cleaning mechanism to the robot arm. By controlling robot arms of the robot, the cleaning mechanism of the cleaning apparatus performs cleaning operations for platforms. The cleaning system achieves continuous and efficient cleaning effects, and operates object cleaning in diverse manners.

20 Claims, 3 Drawing Sheets

(56) References Cited

U.S. PATENT DOCUMENTS

2017/0368579 A1* 12/2017 Prus .......................... B08B 9/00
2018/0036889 A1*  2/2018 Birkmeyer ............. B25J 9/1697

FOREIGN PATENT DOCUMENTS

| CN | 106269615 | 1/2017 |
| CN | 107755334 | 3/2018 |
| CN | 208976464 | 6/2019 |

* cited by examiner

CLEANING SYSTEM AND CLEANING APPARATUS

RELATED APPLICATIONS

This application is a National Phase of PCT Patent Application No. PCT/CN2018/115551 having International filing date of Nov. 15, 2018, which claims the benefit of priority of Chinese Patent Application No. 201811150461.1 filed on Sep. 29, 2018. The contents of the above applications are all incorporated by reference as if fully set forth herein in their entirety.

FIELD OF AND BACKGROUND OF THE INVENTION

The present disclosure relates to a field of cleaning technology, and particularly to a cleaning system and a cleaning apparatus.

During manufacturing of liquid crystal displays (LCDs), there are many steps that require manufacturing equipment to include a platform, on which glass substrates are disposed, to provide a planar level. For example, coaters include a platform in order to have glass substrates be uniformly coated, and pre-baking equipment include a platform to have glass substrates be heated evenly. However, impurities and foreign matters falling on platforms affect the planar level provided by platforms. For instance, height of impurities formed on platforms affect desired thickness of coated photoresist, which is coated on glass substrates disposed on platforms. This results in a phenomenon, called mura (uneven brightness), which often occurs on display panels. Therefore, a platform is one of various major components that is required to be cleaned in each periodic maintenance.

Platforms have to be regularly cleaned in order to ensure that cleanliness of platforms can prevent abnormality of products from happening. According to prior art, platform cleaning operation is executed manually. Manual cleaning operation is performed by directly contacting products, and visual checks of cleaned products can be conducted at the same time while manual cleaning operation is performed, therefore manual cleaning operation achieves acceptable cleaning effects. In addition, under cost considerations, automatic cleaning equipment is not developed and used. However, manual cleaning operations still have two disadvantages: (1) it is difficult for manual cleaning operations to prevent impurities carried by cleaning operators from falling on platforms to cause secondary pollution; and (2) manual cleaning operation is extremely complicated, cleaning operators need to be cleaned from head to foot first before entering the equipment, and cleaning range is smaller and thus cleaning efficiency is low.

Therefore, there is a need to provide a technical solution in order to solve the problems existing in prior art, where platforms cannot be cleaned automatically.

SUMMARY OF THE INVENTION

The present disclosure provides a cleaning system and a cleaning apparatus in order to solve the problems existing in the prior art, where platforms cannot be cleaned automatically.

To solve the aforementioned problems, the present disclosure provides a cleaning apparatus, comprising:
 at least one adaptor mechanism, the at least one adaptor mechanism comprising:
  a locking sleeve, wherein the locking sleeve has an open end;
  a connecting rod, wherein the connecting rod has a first end portion and a second end portion, and the first end portion is connected to the locking sleeve; and
  an engaging member connected to the second end portion of the connecting rod; and
 a cleaning mechanism connected to the engaging member.

In the above-said cleaning apparatus, an elastic member is disposed on the connecting rod between the first end portion and the second end portion.

In the above-said cleaning apparatus, the elastic member is a spring or a rubber article.

In the above-said cleaning apparatus, a flexible lining is disposed on and surrounds an inner wall of the locking sleeve near the open end of the locking sleeve.

In the above-said cleaning apparatus, the locking sleeve includes four sidewalls that are combined to constitute the open end, and the four sidewalls are not connected to each other at one end of the four sidewalls near the open end.

In the above-said cleaning apparatus, the four sidewalls are locked together by a locking device at the end of the four sidewalls where the sidewalls are not connected to each other.

In the above-said cleaning apparatus, the locking device includes:
 a clamp surrounding the end of the four sidewalls where the sidewalls are not connected to each other; and
 a screw and a nut matching the clamp.

In the above-said cleaning apparatus, the cleaning mechanism is connected to the engaging member by way of magnetic attraction.

In the above-said cleaning apparatus, the engaging member includes a recessed area at one end of the engaging member, at least two first magnets are disposed on a surface of the recessed area, and the cleaning mechanism includes at least two second magnets respectively corresponding to the at least two first magnets.

In the above-said cleaning apparatus, the cleaning apparatus includes four adaptor mechanisms and one cleaning mechanism, and the four adaptor mechanisms are commonly connected to the one cleaning mechanism.

In addition, the present disclosure provides a cleaning system including a cleaning apparatus and a robot, wherein the robot incudes at least one robot arm, the cleaning apparatus comprising:
 at least one adaptor mechanism, the at least one adaptor mechanism comprising:
  a locking sleeve, wherein the locking sleeve has an open end connected to the robot arm, and the robot arm is plugged into the open end of the locking sleeve to be connected to the adaptor mechanism;
  a connecting rod, wherein the connecting rod has a first end portion and a second end portion, and the first end portion is connected to the locking sleeve; and
  an engaging member connected to the second end portion of the connecting rod; and
 a cleaning mechanism connected to the engaging member.

In the above-said cleaning system, an elastic member is disposed on the connecting rod between the first end portion and the second end portion.

In the above-said cleaning system, the elastic member is a spring or a rubber article.

In the above-said cleaning system, a flexible lining is disposed on and surrounds an inner wall of the locking sleeve near the open end of the locking sleeve, and the flexible lining is sandwiched between the locking sleeve and the robot arm.

In the above-said cleaning system, the locking sleeve includes four sidewalls that are combined to constitute the open end, and the four sidewalls are not connected to each other at one end of the four sidewalls near the open end.

In the above-said cleaning system, the four sidewalls are locked together by a locking device at the end of the four sidewalls where the sidewalls are not connected to each other.

In the above-said cleaning system, the locking device includes:
 a clamp surrounding the end of the four sidewalls where the sidewalls are not connected to each other; and
 a screw and a nut matching the clamp.

In the above-said cleaning system, the cleaning mechanism is connected to the engaging member by way of magnetic attraction.

In the above-said cleaning system, the engaging member includes a recessed area at one end of the engaging member, at least two first magnets are disposed on a surface of the recessed area, and the cleaning mechanism includes at least two second magnets respectively corresponding to the at least two first magnets.

In the above-said cleaning system, the cleaning apparatus includes four adaptor mechanisms and one cleaning mechanism, and the four adaptor mechanisms are commonly connected to the one cleaning mechanism.

The present disclosure provides a cleaning system and a cleaning apparatus. By controlling robot arms of the robot, the cleaning mechanism of the cleaning apparatus performs cleaning operations for the platforms. The cleaning system achieves continuous and efficient cleaning effects, and realizes object cleaning by diverse manners.

BRIEF DESCRIPTION OF THE SEVERAL VIEWS OF THE DRAWINGS

To detailedly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DESCRIPTION OF SPECIFIC EMBODIMENTS OF THE INVENTION

Figure 1:
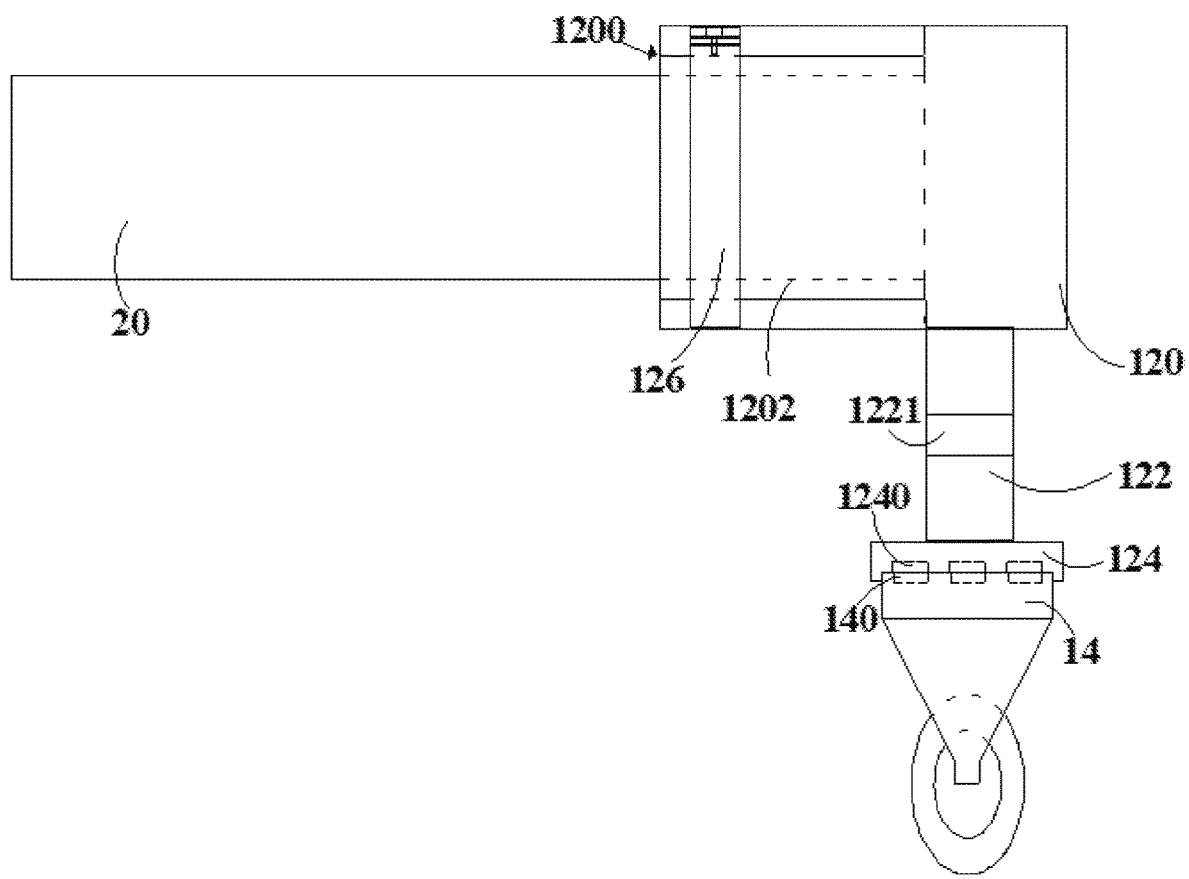
FIG. 1 is a schematic diagram showing a side view of a cleaning system according to a first embodiment of the present disclosure.

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, the same reference symbol represents the same or similar components.

Please refer to FIG. 1, which shows a side view of a cleaning system according to a first embodiment of the present disclosure. The cleaning system includes a cleaning apparatus 10 and a robot. The cleaning apparatus 10 includes at least one adaptor mechanism 12 and a cleaning mechanism 14. The robot incudes at least one robot arm 20. The adaptor mechanism 12 connects the cleaning mechanism 14 to the robot arm 20. With the robot arm 20 of the robot, the cleaning mechanism 14 can approach and contact the object that is needed to be cleaned to perform cleaning operation, or can leave from the cleaned object.

The robot arm 20 could be a plate arranged horizontally and moving in the horizontal and/or vertical direction, or could have a shape and structure that is designed based on needs. According to requirements, the robot arm could have one, two, three, or six degrees of freedom.

The adaptor mechanism 12 includes a locking sleeve 120, a connecting rod 122, and an engaging member 124. The connecting rod 122 connects the locking sleeve 120 to the engaging member 124. The connecting rod 122 could be fixedly connected to the locking sleeve 120 by being integrally formed with the locking sleeve 120, or could be detachably connected to the locking sleeve 120. The engaging member 124 could be fixedly connected to the connecting rod 122 by being integrally formed with the connecting rod 122, or could be detachably connected to the connecting rod 122. The locking sleeve 120 has an open end 1200 connected to the robot arm 20. The robot arm 20 is inserted into the open end 1200 of the locking sleeve 120, and thus is connected to the adaptor mechanism 12. The locking sleeve is made of steel. The connecting rod 122 has a first end portion and a second end portion, wherein the first end portion is connected to the locking sleeve 10, and the second end portion is connected to the engaging member 124. According to requirements, the connecting rod 122 is made a rigid material, such as a rigid plastic material or a steel material. The engaging member 124 is used to connect the cleaning mechanism 14, and could be made of a rigid material, such as a rigid plastic material or a steel material.

The cleaning mechanism 14 could be a dust sticking device, and is used to remove impurities. Alternatively, the cleaning mechanism 14 could be a cleaning sheet with dust-free cloth, and is used to remove stains by performing wet wiping operations. The cleaning mechanism 14 could also be various types of cleaning devices that can be replaced anytime based on actual needs. Cleaned objects could be any elements that have to be cleaned. The cleaned objects of the subject invention are not limited to any specific types of objects. In one preferred embodiment, a cleaned object is a platform including a coater or a platform used in a pre-baking step for manufacturing liquid crystal display (LCD) panels.

With a robot arm of the robot, the cleaning mechanism of the above-said cleaning system contacts the platform, and the cleaning mechanism moves on the surface of the platform, so as to accomplish cleaning of the platforms. Compared with conventionally executed manual cleaning operations, the cleaning system of the present disclosure prevents impurities carried by cleaning operators from falling on platforms and avoids secondary pollution. In addition, the robot arm controls operations of the cleaning mechanism in a continuous and efficient way without fatigue, thus increasing cleaning efficiency. Moreover, different degrees of the cleanliness of the cleaned platforms can be satisfied by the cleaning system because the cleaning mechanisms are of various types and can be easily replaced with each other, therefore the cleaning system of the present disclosure can operate object cleaning in diverse manners.

Figure 2:
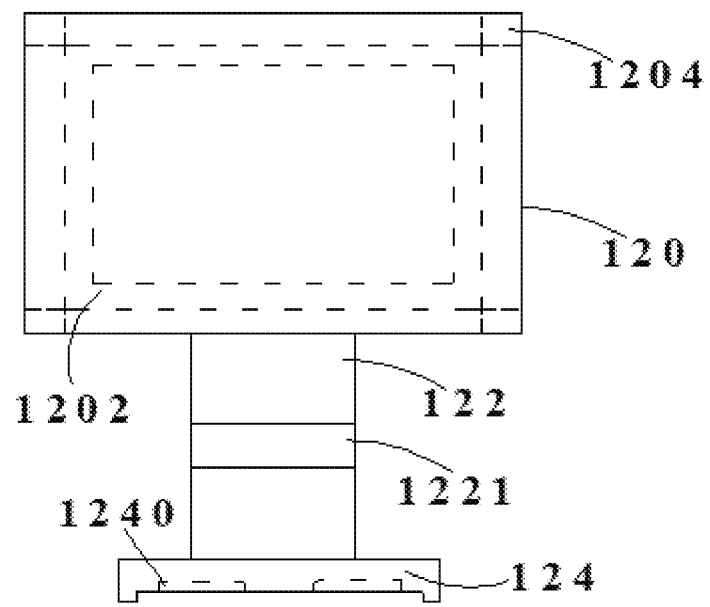
FIG. 2 is a schematic diagram showing a front view of an adaptor mechanism of the cleaning system of FIG. 1.

Please further refer to FIG. 2, which shows a front view of an adaptor mechanism 12 of the cleaning system of FIG. 1. An elastic member 1221 is disposed on the connecting rod 122 between the first end portion and the second end portion. The elastic member 1221 functions as a buffer to prevent the cleaning mechanism 14 from being damaged or to prevent the robot arm 20 from being broken because of produced pressure when a force is exerted to the cleaning mechanism 14. The elastic member 1221 could be a plurality of springs with two ends of the springs connected to the first end portion of the connecting rod 122 and the second end portion of the connecting rod 122. A connection therebetween can be a fixed connection, such as by welding. Alternatively, the connection therebetween can be detachable connection. For example, one end of the springs passes through the holes formed at the first end portion of the connecting rod 122, so that the springs are connected to the first end portion of the connecting rod 122. The elastic member 1221 could also be a rubber article. The rubber article is detachably connected to the first end portion of the connecting rod 122 and the second end portion of the connecting rod 122. For example, the first end portion of the connecting rod 122 includes a clamping portion to clamp one end of the rubber article. The clamping portion could have a shape of a roller or a plate. The rubber article could be made of ethylene-propylene diene monomer (EPDM) rubber, polyurethane rubber, or other rubber materials. The connecting manner between the first end portion of the connecting rod 122 and the elastic member 1221 can be identical to or different from the connecting manner between the second end portion of the connecting rod 122 and the elastic member 1221. The connecting manner therebetween is not limited to any specific connecting manner.

Please further refer to FIGS. 1 and 2. A flexible lining 1202 is disposed on and surrounds an inner wall of the locking sleeve 120 near the open end 1200 of the locking sleeve 120. The flexible lining 1202 is sandwiched between the locking sleeve 120 and the robot arm 20. The flexible lining 1202 is configured to prevent any slides from occurring between the robot arm 20 and the locking sleeve 120, where such slides affect cleaning efficiency. The inner wall of the locking sleeve 120 near the open end 1200 has a thickness that is larger than the inner wall of the locking sleeve 120 distanced from the open end 1200. The flexible lining 1202 is disposed on and surrounds the inner wall of the locking sleeve 120 having larger thickness near the open end 1200 of the locking sleeve 120. The flexible lining 1202 could be a layer made of rubber or sponge. The flexible lining 1202 of the present disclosure is not limited to any specific materials of lining.

The locking sleeve 120 includes four sidewalls that are combined to constitute the open end 1200. The four sidewalls are not connected to each other at one end of the four sidewalls near the open end 1200. There is a gap 1204 formed between any two adjacent sidewalls. Because the four sidewalls are not connected to each other at one end of the four sidewalls near the open end 1200, the robot arm 20 can be easily inserted into the open end 1200. There is an adjustable space when the robot arm 20 is inserted thereinto.

The four sidewalls are locked together by a locking device 126 (see FIG. 1) at the end of the four sidewalls where the sidewalls are not connected to each other to ensure that the robot arm 20 is fixedly joined with the locking sleeve 120. The locking device 126 could be an assembly that includes a clamp, a screw, and a nut. The clamp surrounds the end of the four sidewalls of the locking sleeve where the sidewalls are not connected to each other, and the clamp is tightened by the screw and the nut matching the clamp. The clamp could be consisted of two bodies with each having vertical portion, or could be consisted of one frame-type body. Two ends of the clamp include through-holes that allow the screw to pass therethrough. The nut is rotated around the screw, so that the robot arm 20 is tightly joined to the locking sleeve 120.

Furthermore, as shown in FIG. 1, the cleaning mechanism 14 is connected to the engaging member 124 by way of magnetic attraction. The engaging member 124 includes a recessed area at one end of the engaging member 124, where a surface and two pairs of opposite side surfaces surround the surface constitute the recessed area. At least two first magnets 1240 are disposed on a surface of the recessed area, and the cleaning mechanism 14 includes at least two second magnets 140 respectively corresponding to the at least two first magnets 1240. With magnetic attraction between the first magnets 1240 and the second magnets 140 corresponding thereto, the cleaning mechanism 14 is detachably connected to the adaptor mechanism 12, and the cleaning mechanism 14 can be replaced based on actual needs. It is understood that the engaging member 124 can be connected to the cleaning mechanism 14 in other manners, such as a snap-acting mechanism or a screw fixing mechanism.

Figure 3:
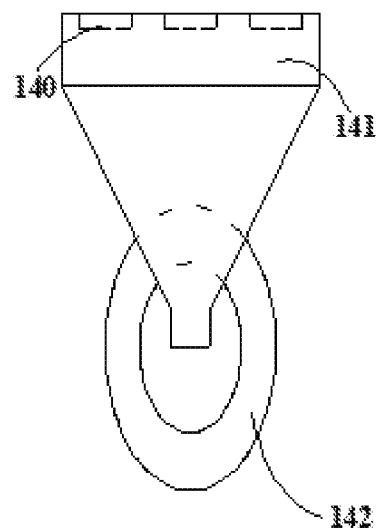
FIG. 3 is a schematic diagram showing a side view of a first embodiment of a cleaning mechanism of a cleaning system according to the present disclosure.

Please see FIG. 3, which shows a side view of a first embodiment of a cleaning mechanism of a cleaning system according to the present disclosure. The cleaning mechanism 14 is a dust sticking device that is used to preliminarily clean the platforms. The dust sticking device includes a support body 141 and a dust sticking roller 142. The support body 141 includes a main plate, two side plates disposed at two sides of the main plate, and a plurality of the second magnets. The side plates are fixedly connected to the main plate in the vertical direction. The second magnets 140 are disposed on surfaces of the side plates opposite to the main plate. In order to connect the dust sticking device to the engaging member 124, the second magnets 140 are paced to respectively correspond to the first magnets 1240. The dust sticking roller 142 includes a rotation shaft and a double-sided adhesive roll. The double-sided adhesive roll is consisted of two release films and an adhesive layer therebetween. Two ends of the shaft are respectively connected to the two side plates in a movable manner. As the dust sticking device performs dust sticking operation, one release film has to be removed for the adhesive layer to contact the platforms and glue impurities on the platforms.

Figure 4:
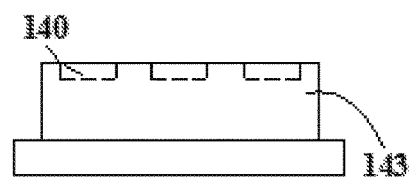
FIG. 4 is a schematic diagram showing a side view of a second embodiment of a cleaning mechanism of a cleaning system according to the present disclosure.

Please see FIG. 4, which shows a side view of a second embodiment of a cleaning mechanism of a cleaning system according to the present disclosure. The cleaning mechanism 14 is a cleaning sheet with a dust-free cloth, which is used to remove stains by performing wet wiping operations. The cleaning sheet with the dust-free cloth includes a plate 143, a dust-free cloth (not shown), and a plurality of the second magnets 140. The size of the plate 143 fits the size of the recessed area of the engaging member 124 to facilitate connection between the plate 143 and the engaging member 124. The dust-free cloth covers one surface of the plate 143, and a plurality of the second magnets 140 are disposed on the other surface of the plate 143, which is opposite to the surface of the plate 143 covered by the dust-free cloth. As the cleaning sheet with the dust-free cloth is connected to the engaging member 124, the second magnets 140 respectively correspond to the first magnets 1240.

Figure 5:
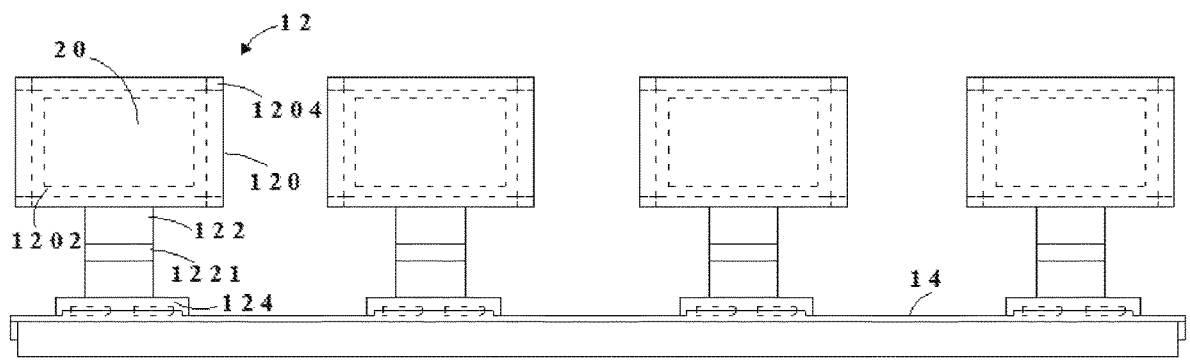
FIG. 5 is a schematic diagram showing a side view of a cleaning system according to a second embodiment of the present disclosure.

FIG. 5 shows a side view of a cleaning system according to a second embodiment of the present disclosure. The second embodiment differs from the first embodiment in that, in the second embodiment, the cleaning apparatus 10 includes four adaptor mechanisms 12 and one cleaning mechanism 14, and the robot includes four robot arms 20. The four adaptor mechanisms 12 are commonly connected to the one cleaning mechanism 14. The four robot arms 20 are arranged horizontally in the same plane. According to this embodiment, the cleaning system can perform cleaning operations for the platforms having larger areas.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A cleaning apparatus, comprising:
   at least one adaptor mechanism, the at least one adaptor mechanism comprising:
      a locking sleeve, wherein the locking sleeve has an open end;
      a connecting rod, wherein the connecting rod has a first end portion and a second end portion, and the first end portion is connected to the locking sleeve; and
      an engaging member connected to the second end portion of the connecting rod; and
   a cleaning mechanism connected to the engaging member.

2. The cleaning apparatus according to claim 1, wherein an elastic member is disposed on the connecting rod between the first end portion and the second end portion.

3. The cleaning apparatus according to claim 2, wherein the elastic member is a spring or a rubber article.

4. The cleaning apparatus according to claim 1, wherein a flexible lining is disposed on and surrounds an inner wall of the locking sleeve near the open end of the locking sleeve.

5. The cleaning apparatus according to claim 1, wherein the locking sleeve includes four sidewalls that are combined to constitute the open end, and the four sidewalls are not connected to each other at one end of the four sidewalls near the open end.

6. The cleaning apparatus according to claim 5, wherein the four sidewalls are locked together by a locking device at the end of the four sidewalls where the sidewalls are not connected to each other.

7. The cleaning apparatus according to claim 6, wherein the locking device includes:
   a clamp surrounding the end of the four sidewalls where the sidewalls are not connected to each other; and
   a screw and a nut matching the clamp.

8. The cleaning apparatus according to claim 1, wherein the cleaning mechanism is connected to the engaging member by way of magnetic attraction.

9. The cleaning apparatus according to claim 8, wherein the engaging member includes a recessed area at one end of the engaging member, at least two first magnets are disposed on a surface of the recessed area, and the cleaning mechanism includes at least two second magnets respectively corresponding to the at least two first magnets.

10. The cleaning apparatus according to claim 1, wherein the cleaning apparatus includes four adaptor mechanisms and one cleaning mechanism, and the four adaptor mechanisms are commonly connected to the one cleaning mechanism.

11. A cleaning system including a cleaning apparatus and a robot, wherein the robot incudes at least one robot arm, the cleaning apparatus, comprising:
   at least one adaptor mechanism, the at least one adaptor mechanism, comprising:
      a locking sleeve, wherein the locking sleeve has an open end connected to the robot arm, and the robot arm is plugged into the open end of the locking sleeve to connect to the adaptor mechanism;
      a connecting rod, wherein the connecting rod has a first end portion and a second end portion, and the first end portion is connected to the locking sleeve; and
      an engaging member connected to the second end portion of the connecting rod; and
   a cleaning mechanism connected to the engaging member.

12. The cleaning system according to claim 11, wherein an elastic member is disposed on the connecting rod between the first end portion and the second end portion.

13. The cleaning system according to claim 12, wherein the elastic member is a spring or a rubber article.

14. The cleaning system according to claim 11, wherein a flexible lining is disposed on and surrounds an inner wall of the locking sleeve near the open end of the locking sleeve, and the flexible lining is sandwiched between the locking sleeve and the robot arm.

15. The cleaning system according to claim 11, wherein the locking sleeve includes four sidewalls that are combined to constitute the open end, and the four sidewalls are not connected to each other at one end of the four sidewalls near the open end.

16. The cleaning system according to claim 15, wherein the four sidewalls are locked together by a locking device at the end of the four sidewalls where the sidewalls are not connected to each other.

17. The cleaning system according to claim 16, wherein the locking device includes:
   a clamp surrounding the end of the four sidewalls where the sidewalls are not connected to each other; and
   a screw and a nut matching the clamp.

18. The cleaning system according to claim 11, wherein the cleaning mechanism is connected to the engaging member by way of magnetic attraction.

19. The cleaning system according to claim 18, wherein the engaging member includes a recessed area at one end of the engaging member, at least two first magnets are disposed on a surface of the recessed area, and the cleaning mechanism includes at least two second magnets respectively corresponding to the at least two first magnets.

20. The cleaning system according to claim 11, wherein the cleaning apparatus includes four adaptor mechanisms and one cleaning mechanism, and the four adaptor mechanisms are commonly connected to the one cleaning mechanism.

* * * * *